(12) United States Patent
Chinkiwsky

(10) Patent No.: US 8,186,288 B2
(45) Date of Patent: May 29, 2012

(54) METHOD OF APPLYING AN INPUT TO AN AGRICULTURAL FIELD

(75) Inventor: Patrick Chinkiwsky, Davenport, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 12/684,165

(22) Filed: Jan. 8, 2010

(65) Prior Publication Data

US 2011/0172811 A1 Jul. 14, 2011

(51) Int. Cl.
*A01C 15/00* (2006.01)
*G06F 7/70* (2006.01)
*G06F 19/00* (2006.01)
*G06G 7/00* (2006.01)
*G06G 7/76* (2006.01)

(52) U.S. Cl. ............... 111/200; 111/900; 701/50; 702/5

(58) Field of Classification Search .......... 111/200, 111/900, 903; 701/50; 702/5; 700/9, 240, 700/241, 244, 283, 284
See application file for complete search history.

(56) References Cited

U.S. PATENT DOCUMENTS

| | | | |
|---|---|---|---|
| 5,878,679 | A | 3/1999 | Gregor et al. |
| 5,913,915 | A | 6/1999 | McQuinn |
| 6,216,614 | B1 | 4/2001 | Wollenhaupt |
| 6,236,924 | B1 | 5/2001 | Motz et al. |
| 6,522,948 | B1 | 2/2003 | Benneweis |
| 6,606,542 | B2 * | 8/2003 | Hauwiller et al. ............ 700/283 |
| 7,395,769 | B2 | 7/2008 | Jensen |
| 7,571,688 | B1 | 8/2009 | Friestad et al. |
| 7,661,516 | B2 | 2/2010 | Dillman |
| 7,690,440 | B2 | 4/2010 | Dean et al. |
| 2003/0070597 | A1 * | 4/2003 | Cresswell ...................... 111/200 |
| 2008/0105177 | A1 | 5/2008 | Dix et al. |

FOREIGN PATENT DOCUMENTS

| | | |
|---|---|---|
| CA | 2635401 | 3/2009 |
| CA | 2650340 | 4/2009 |
| EP | 1692929 | 11/2007 |
| FR | 2800232 | 5/2001 |
| GB | 2342342 | 4/2000 |

OTHER PUBLICATIONS

European Search report received May 24, 2011 (6 pages).
The Master Seeder Your Precision Seeding Newsletter [online] vol. 5—Issue 2—Winter 2009. Retrieved from the Internet <url: http://seedmaster.ca/files/2349_Master%20Seeder%20NL%20Nov%202009%20Web.pdf.
Fundamentals of Machine Operation—Planting (1981), (3 pages).
"Swath Control Pro" system of Deere (Jul. 23, 2010) retrieved from the internet (Nov. 25, 2010) (1 page).

* cited by examiner

*Primary Examiner* — Christopher J. Novosad

(57) ABSTRACT

A method of applying an input to a field is provided when using an implement having row or section control and when using an automated location and guidance system, enabled by GPS or other position technology, to avoid double application of inputs in areas covered more than once by the implement or machine. The present invention provides an application pattern and control in which double application is avoided by turning off row units or sections of row units during the first pass over the area, leaving the actual application of inputs to the second pass over that area. The minimizes or eliminates areas where a previously applied input is disturbed during a second time over that area and minimizes or eliminates areas where the soil is compacted around previously planted seed by driving over the area a second time after seeding.

5 Claims, 4 Drawing Sheets

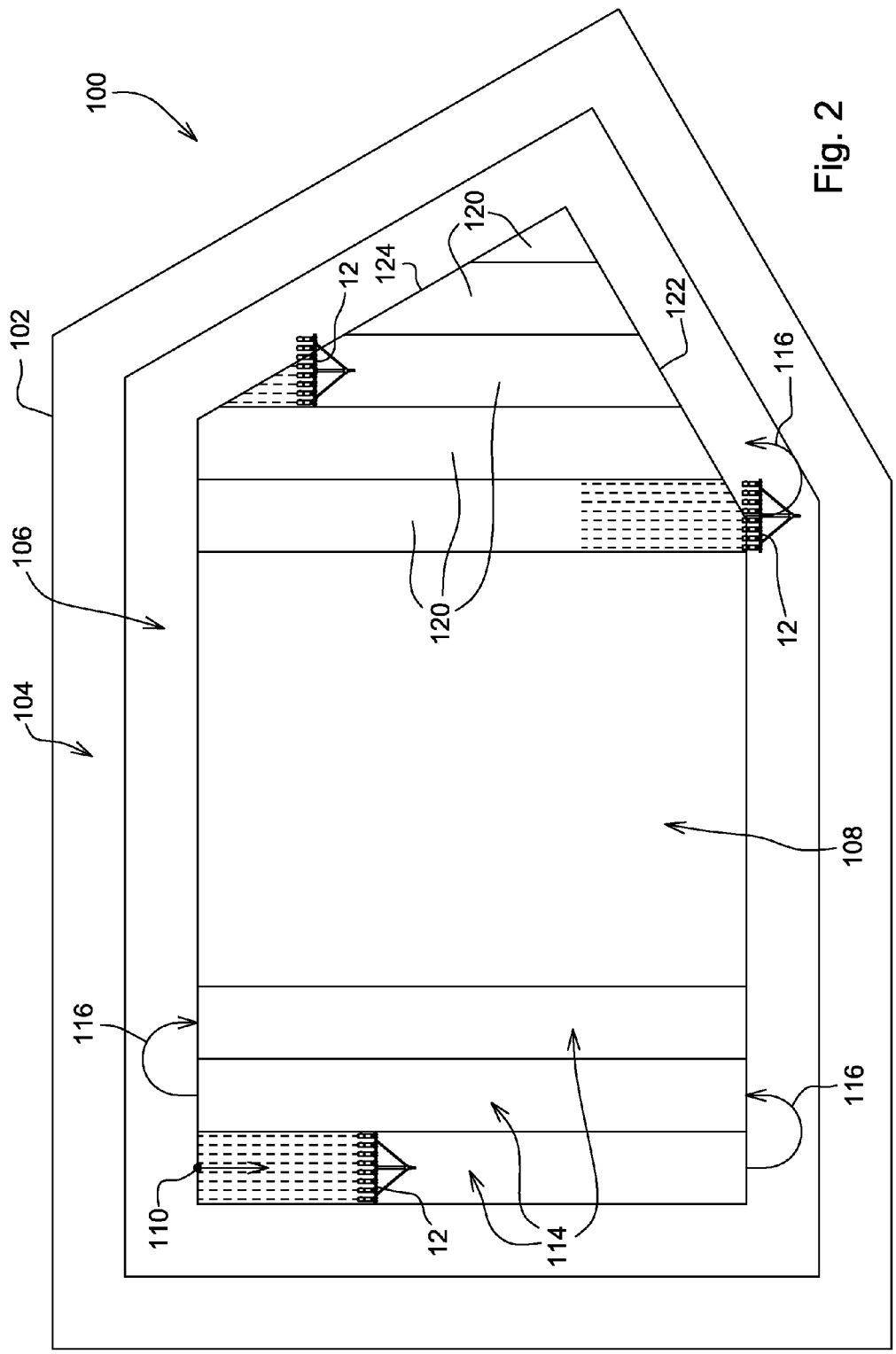

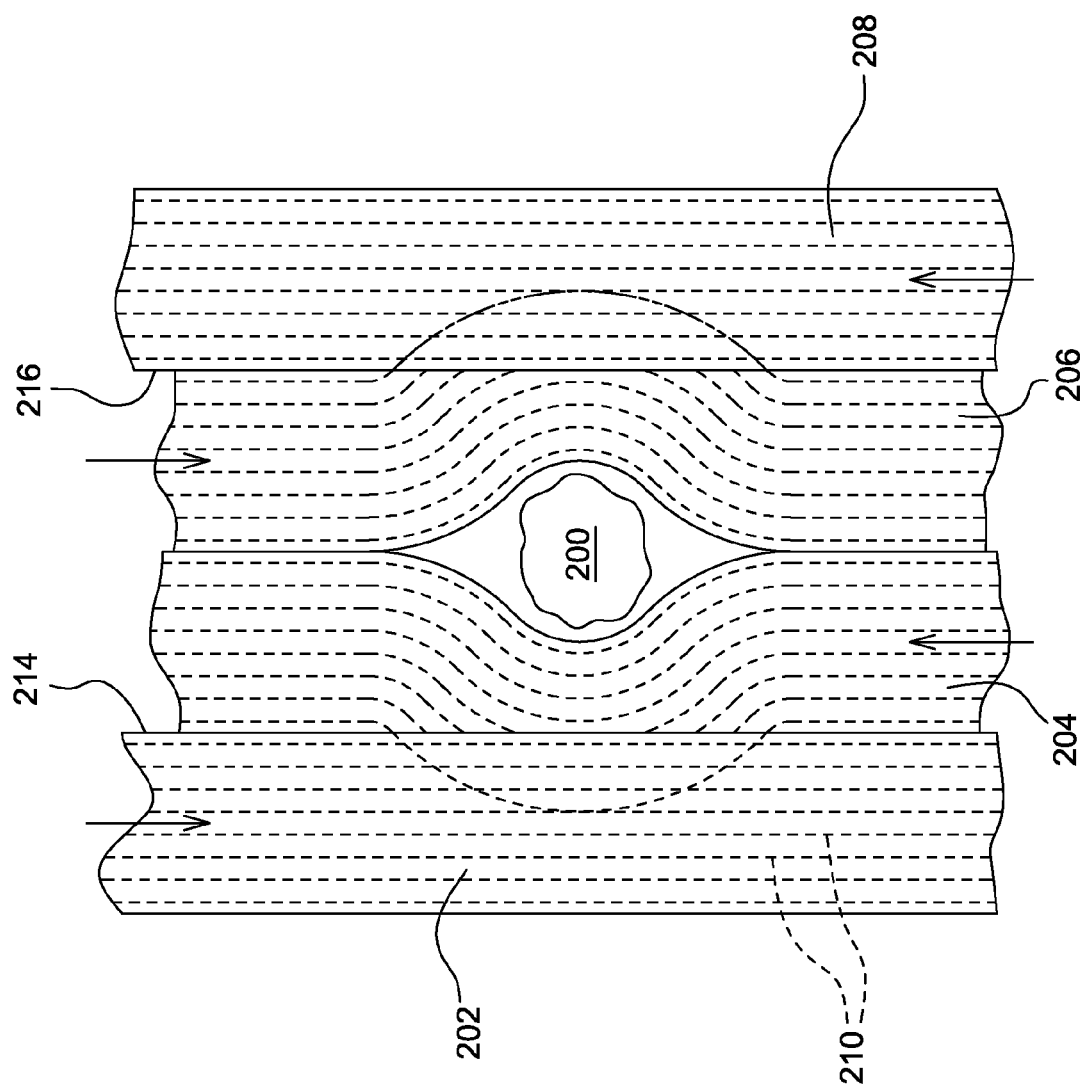

METHOD OF APPLYING AN INPUT TO AN AGRICULTURAL FIELD

FIELD OF THE INVENTION

The present invention relates to a method of applying inputs, such as seed or fertilizer, to an agricultural field and in particular to a method utilizing row or section control of the implement to avoid double seeding by turning off some of the product dispensers during the first pass over an area which is covered twice.

BACKGROUND OF THE INVENTION

When seeding a field or applying other inputs, a standard approach by producers is to make one to three headland passes around the field while applying seed and or fertilizer. Back and forth passes are then made in the center area of the field. By first planting in the headland passes, a line is formed in the field to indicate where to start and stop the back and forth passes in the center area while turning in the implement in the previously seeded headland area. A disadvantage of such a pattern is that while turning in the headland area, the tractor and implement will drive over the previously seeded headland area, causing compaction of the soil and disturbing the already planted seed. One way to avoid compaction of previous seeded soil is to seed the headline area last. This approach, however, requires the operator to estimate the point in the field where the back and forth passes start and stop. To ensure that the field is completely seeded, operators will tend to overlap into the inner headland area. When the headland area is subsequently planted, there will be an area that is double seeded and/or which may have double the amount of fertilizer or other chemical applied thereto.

Recent advances in machine technology have enabled individual product dispensers of a planter to be selectively turned off to avoid dispensing seed where seed has already been planted or where it is desired not to plant seed. One technology for doing so is shown in U.S. Pat. No. 7,571,688, hereby incorporated by reference, where clutches are provided between the drive cable and seed meter to enable the each seed meter to be separately turned off. Another example is shown in U.S. patent application Ser. No. 12/481,254, filed Jun. 9, 2009, and also incorporated herein by reference, in the context of an air seeder where a section of dispensers can be selectively turned off by closing the outlet from the meter. Such technology is a beneficial when finishing the last back and forth pass where the width of the implement is wider than the remaining area to be seeded resulting in a portion of the implement overlapping previously seeded soil in the headland area. The dispensers in the headland area can be turned off to avoid double seeding. However, the ground engaging tools of each dispenser still engage soil and can disturb the previously planted seed. Furthermore, the tires of the implement and tractor can cause soil compaction around the planted seed.

The individual row clutches or the section control can also be beneficial in planting an irregularly shaped field where all of the rows do not end at the same point where the implement passes into the headland area. As the implement approaches the end of the rows, individual row units or sections of row units can be shut off individually to avoid the double planting in the headland.

Similar technology is available for use on sprayers to individually shut off the spray nozzles to avoid double spraying.

SUMMARY OF THE INVENTION

The present invention provides an improved method of applying an input to a field when using an implement having row or section control and when using an automated location and guidance system, enabled by GPS or other position technology, to avoid double application of inputs in areas covered more than once by the implement or machine. The present invention provides an application pattern and control in which double application is avoided by turning off row units or sections of row units during the first pass over the area, leaving the actual application of inputs to the second pass over that area. The method further controls the implement such that on the second pass, the full width of the machine is used. This is particularly advantageous when seeding because the implement does not operate in soil that has already been seeded.

BRIEF DESCRIPTION OF THE DRAWINGS

FIG. 2 is a plan view of an agricultural field illustrating the method of the present invention;

FIG. 5 is a plan view of a portion of a field illustrating yet another aspect of the method of the present invention when planting around an obstacle in the field.

DESCRIPTION OF THE PREFERRED EMBODIMENT

Figure 1:
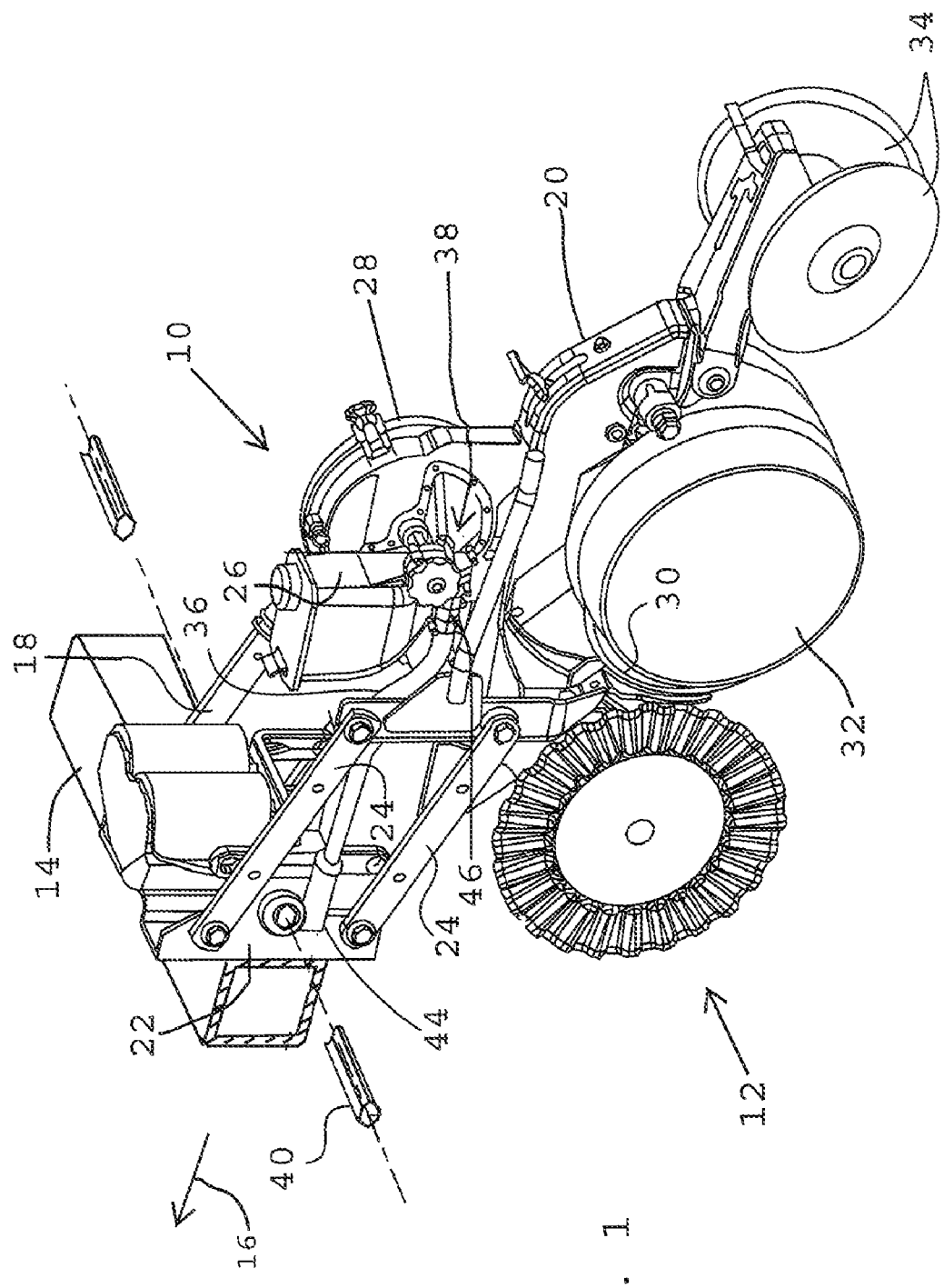
FIG. 1 is a perspective view of a dispenser of a planting machine.

The method of the present invention is described below primarily in the context of a row crop planter. However, the method is applicable broadly to any input application machine such as but not limited to planter, air seeders, grain drills, fertilizer and chemical applicators, sprayers, etc. Referring to FIG. 1, a row unit 10 of a row crop planter 12 is shown. The planter 12 includes a transversely extending tool bar 14 to which the row unit 10 is mounted. While a single row unit is show, multiple row units 10 are spaced along the tool bar 14, each applying seed in a row as the tool bar is moved across a field in an forward direction shown by the arrow 16. The planter 12 is connected to a tractor (not shown in FIG. 1) in a conventional manner and the planter and tractor together constitute a machine for applying an input to an agricultural field. The planter or other input applicator could be self-propelled instead of an implement for attachment to a tractor. The tractor or self-propelled machine is equipped with a guidance system such as AutoTrac™ or iGuide™ available from John Deere to guide the machine along a path in the field. Such guidance systems use GPS or other positioning systems to locate the machine in the field and to guide its movement across the field.

The row unit 10 includes a frame 20 that is coupled to a mounting plate 22 by a parallel linkage 24. The parallel linkage 24 allows the row unit to move up and down to a limited degree relative to the toolbar 14. Seed is automatically directed to an auxiliary hopper 26 by a pneumatic seed on demand delivery system (not shown). Seed in the auxiliary hopper 26 is metered by a seed meter 28 and directed to a planting furrow by a seed tube (not shown) in a known manner. The planting furrow is formed by a double disc furrow opener 30. Depth gauging wheels 32 control the depth of penetration of the opener 30. The planting furrow with metered seed deposited therein by the seed tube is closed by closing wheels 34. The seed meter 28 is driven by a flexible rotatable drive shaft 36 that drives second gear box 38. A ground driven common rotary drive, in the form of a hexagonal cross-section bar 40, provides a rotational input to the flexible drive shaft 36 through a first gearbox 44. A clutch 46 is provided at the coupling of the drive shaft 36 to the second gear box 38. The clutch 46 is selectively operated to disengage the drive to the seed meter 28 thereby stopping the operation of the seed meter and the dispensing of seed through the seed tube to the seeding furrow. The clutches 46 may be individually controlled or two or more clutch assemblies on adjacent row units may be controlled together in what is known as "section control."

The furrow opener 30 constitutes a ground engaging tool and remains engaged in the ground both when seed is being dispensed as well as when seed is not being dispensed by control of the clutches. Other seeding equipment such as air seeders and grain drills have ground engaging openers as do fertilizer and chemical applicators. These machines also have input meters and dispensers, such as seed tubes and/or chemical tubes.

The method a applying an input to an agricultural field according to the present invention is shown and described in connection with FIG. 2. FIG. 2 illustrates an irregularly shaped field 100. The first step is to define the field perimeter 102. This can be accomplished by driving along the perimeter in a first, perimeter headland pass 104 having the width of the planter 12. Planter 12 is shown schematically with the toolbar 14 and row units 12 shown as boxes. The first perimeter headland 104 can be driven with the planting machine operating to plant in the headland 104 or without operating the planter. Typically, the position sensor on the machine will be in the machine center, a half-width of the machine from the field perimeter. Alternatively, the perimeter can be defined by driving another vehicle, such as an all-terrain vehicle, along the perimeter with the necessary guidance system installed to record the vehicle path and with the spacing between the position sensor on the vehicle and the perimeter 102 known. A field perimeter definition recorded during an operation in a previous growing season can also be used.

The perimeter headland area 104 is defined inside the perimeter 102 consisting of one width of the seeding machine. One or more additional headland areas 106 are defined inside the perimeter headland area 104 as desired. Each additional headland area has a width equal to the width of the machine 12. The headland area at the top and bottom of the field as shown in FIG. 2 is used for turning the machine as described below. Additionally, the headland area at the right side of the field will be used for turning the machine. However, the headland area at the left side is not used for turning and thus may be narrower than the other headland areas but still in multiples of the machine width.

After determining the total headland area, the remaining center area 108 of the field 100 is then defined. Beginning with a selected starting location such as the point 110, a path plan is determined for seeding the field beginning with the center area 108. The center area path plan consists of a series of back and forth passes 114 with turns 116 executed at the ends of the back and forth passes. The turns take place in the headland areas 104 and 106. The path planning may be a mental step by the machine operator or may be done by a computer program that is part of the machine guidance system. When the machine reaches the boarder between the center area 108 and the headland area, the row units are turned off, to stop dispensing seed. For those back and forth passes 114 which are perpendicular to the boarder of the center area, when the machine reaches the end of the pass, the tool bar 14 is raised, lifting the ground engaging tools from the ground. This also lifts the drive wheel for the shaft 40 from the ground, stopping the dispensing of seed from all row units at the same time.

Back and forth passes 120 at the right side of the field have borders 122 and 124 with the headland area which are inclined relative to the direction of machine travel in the back and forth passes. As the machine crosses the borders, the row units are turned on and off, one at a time, or one section at time as those row units cross the border. This is shown by the broken lines trailing each row unit representing the seed rows. This is shown in the enlarged view of FIG. 3. A row crop planter 130 is shown in the pass 120 crossing the border 124 between the center area and the headland area 106. Individual row units 10 are shut off as they cross the border. The seed rows are shown by the broken lines 132.

Section control is shown with the back and forth pass 134. The dispensers for multiple plant rows are simultaneously controlled resulting in two or more rows starting or stopping together. As the machine crossed the border 124, the sections were turned off or on, producing a stair step pattern as multiple rows are shut off at a time.

Figure 4:
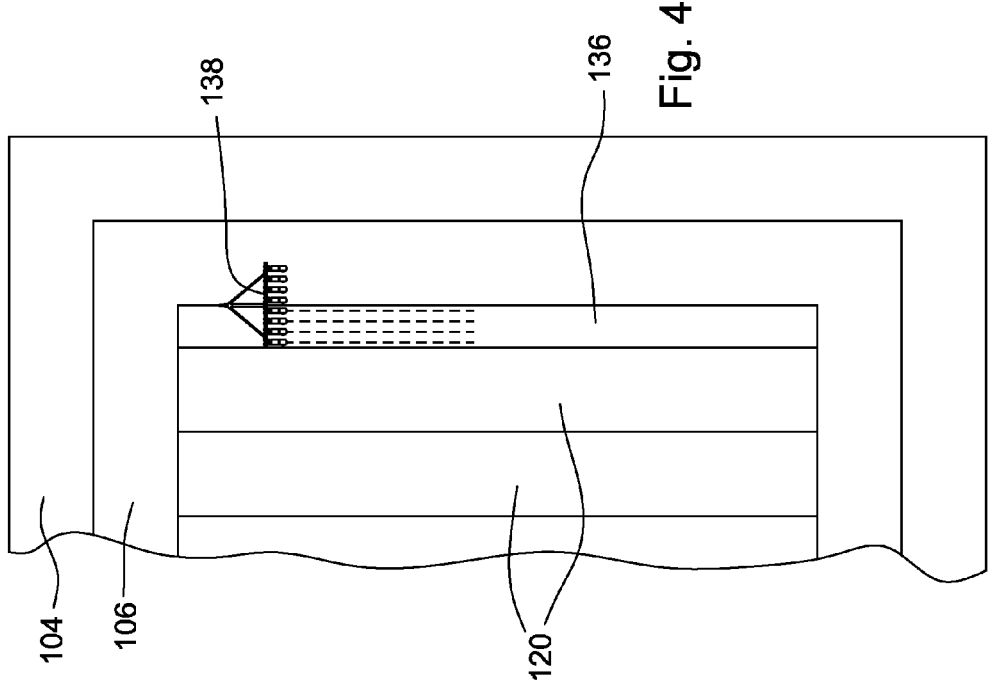
FIG. 4 is a plan view illustrating another aspect of the method of the present invention when planting along the edge of a field.

FIG. 4 shows another application where the final back and forth pass 136 is narrower than the width of planter 138. When planting in the last pass 136, only those row units in the area of the pass 136 are operating. The row units in the area of the headland 106 are shut off.

As a final step, the headland area is then planted. Headland area 106 is planted at a full machine width. Headland area 104 is also planted at a full width. Headland 104 may be planted last or may have been planted during the first step when the field perimeter is determined. The perimeter headland 104 may be planted using manual operation of the machine. This will be the case if the planting of the perimeter headland occurs during definition of the field perimeter. Furthermore, if the field perimeter is defined from a machine operation in a previous growing season, there may be some variation in the actual field perimeter this season, due to erosion, etc. from the definition from the previous season. As a result, the perimeter headland 104 will preferably be planted by manual operation rather than automatic operation to be able to compensate for changes in the perimeter. The manual planting of the perimeter headland 104, whether performed first or last, may result in some overlap with the inner headland area 106 or with the center area 108 if there is only one headland area.

Figure 3:
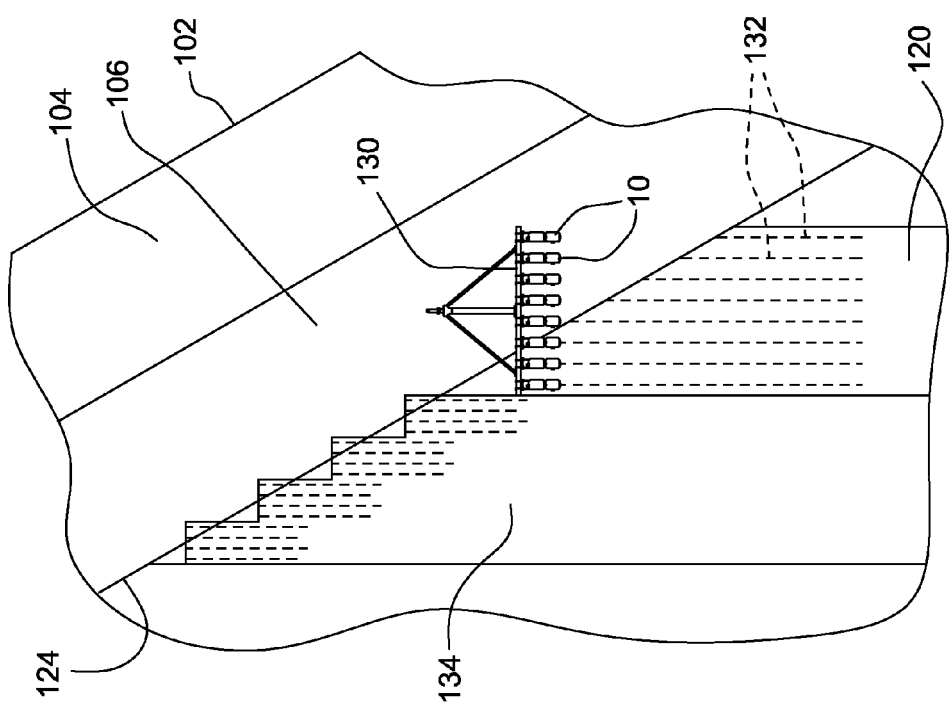
FIG. 3 is an enlargement of a portion of the field shown in FIG. 2 illustrating the invention when used to plant point rows.

The back and forth passes have been shown in FIGS. 2-4 as being straight passes. Depending on the contours of the field, the passes may follow a curved path. In either case, the back and forth passes will generally be parallel with one another.

An obstacle in the field can be dealt with as shown in reference to FIG. 5. Here an obstacle 200 is in the center area of the field. The obstacle may be a wet area that can not be planted, a rock pile, a standard for overhead electric wires, etc. Four back and forth passes 202, 204, 206 and 208 are shown surrounding the obstacle. The pass 202 is worked first with the machine planting in rows shown by the lines 210. After turning, while working the subsequent pass 204 and planting the broken lines 212, the operator or machine control system steers the machine around the obstacle by turning into the preceding pass area 202, forming an incursion into pass 202. The control system, knowing that pass area 202 has already been planted, will turn off the row units once they pass over the border 214 between the two pass areas 202 and 204. This avoids double planting but does not prevent disturbing the seed. The incursion into the preceding pass is recorded for future operations. When planting in the following season, the control system will know that there will be an incursion from the subsequent pass 204 into pass 202 and can turn off the row units during pass 202 in the incursion area. Then, when working pass 204 the row units can remain on and plant in the incursion area on the second time over that area. As an option, the operator may override the recording of the incursion if the obstacle will not likely be present during future operations. This may be the case if the obstacle is a wet area due to unusually high rainfall during the current planting season. Alternatively, during the first year planting operation, when the incursion occurs, the seed dispensers may remain on to double seed and ensure that the seed will be placed in the soil at the desired depth for proper emergence. The seed planted in the first pass will be disturbed and may no longer be at the proper depth. However, any fertilizer dispenser can be turned off during the incursion to prevent double fertilizer in the area as this can be detrimental to overall plant health.

On the following pass 206, when the operator steers around the obstacle, the machine makes an incursion into the subsequent pass 208 which is yet to be worked. Since the control system knows where the pass 208 is located, when the row units cross the border 216 into the subsequent pass 208, the row units are shut off. After turning, during working of pass 208, the row units remain on, and plant pass 208 with a full implement width, seeding the incursion area on the second pass over that area.

In the claims that follow, the term "machine" is used broadly to mean a self-propelled input applicator or to a tractor and implement combination.

Where an area of a field is covered twice during the application of an input, the method of the present invention controls the product dispensers to dispense product only the second time the area is covered.

Having described the preferred embodiment, it will become apparent that various modifications can be made without departing from the scope of the invention as defined in the accompanying claims.

The invention claimed is:

1. A method of applying an input to an agricultural field with a machine having multiple input dispensers arranged across a machine width to apply the input in rows as the machine is moved over a field, the machine further having control system to selectively stop one or more dispensers from dispensing the input while the remaining dispensers continue to dispense the input and the machine further having propulsion means and automated location and guidance means, the method comprising the steps of:
    applying the input to an outer headland pass area adjacent a field perimeter having a width equal to the machine width;
    defining an inner headland pass area of one or more full implement widths inside the outer headland pass area;
    defining a center area inside the inner headland pass area;
    applying input to the center area; and
    subsequently applying the input to the inner headland area.

2. The method of claim 1 wherein the outer and inner headland pass areas surround the entire field.

3. The method of claim 1 wherein the outer and inner headland pass areas are defined only at opposite ends of the field.

4. A machine for applying an input to an agricultural field comprising:
    multiple input dispensers arranged across a machine width to apply the input in rows as the machine is moved over a field;
    a control system to selectively stop one or more dispensers from dispensing the input while the remaining dispensers continue to dispense the input; and
    an automated location and guidance system wherein the control system and the location and guidance systems are adaptable to:
        define an outer headland pass area consisting of a full width of the machine to be made around the field adjacent a field perimeter as input is applied to the outer headland pass area;
        define an inner headland pass area of one or more full implement widths inside and adjacent the outer headland pass area;
        define a remaining field center area inside the inner headland pass area to have the input applied in back and forth passes of the machine;
        determine a path plan to apply the input with back and forth passes in the center area and turning the machine in the headland pass areas at the ends of the center area;
        execute the path plan to apply the input to the center area and turning off any of the dispensers while the dispensers are in the headland pass areas at the ends of the center area and during any partial width pass along a side of the center area where a portion of the dispensers are in the center area and a portion of the dispensers are in the headland pass areas; and
        then apply the input to the inner headland pass area using the full width of the machine.

5. A machine for applying an input to an agricultural field comprising:
    multiple input dispensers arranged across a machine width to apply the input in rows as the machine is moved over a field;
    a control system to selectively stop one or more dispensers from dispensing the input while the remaining dispensers continue to dispense the input; and
    an automated location and guidance system wherein the control system and the location and guidance systems are adaptable to:
        define an outer headland pass area consisting of a full width of the machine to be made at opposite ends of the field adjacent the field perimeter as input is applied to the outer headland pass area;
        define an inner headland pass area of one or more full implement widths inside and adjacent the outer headland pass area;
        define a remaining field center area inside the inner headland pass area to have the input applied in back and forth passes of the machine;
        determine a path plan to apply the input with back and forth passes in the center area and turning the machine in the headland pass areas at the ends of the center area;
        execute the path plan to apply the input to the center area and turning off any of the dispensers while the dispensers are in the headland pass areas at the ends of the center area; and
        then apply the input to the inner headland pass area using the full width of the machine.

* * * * *